United States Patent
Komori et al.

(10) Patent No.: US 12,034,285 B2
(45) Date of Patent: Jul. 9, 2024

(54) HOT MELT BLOCK, CABLE MANUFACTURING METHOD, AND CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Takahiro Murata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 704 days.

(21) Appl. No.: 17/262,995

(22) PCT Filed: Jul. 18, 2019

(86) PCT No.: PCT/JP2019/028263
§ 371 (c)(1),
(2) Date: Jan. 25, 2021

(87) PCT Pub. No.: WO2020/031649
PCT Pub. Date: Feb. 13, 2020

(65) Prior Publication Data
US 2021/0167587 A1    Jun. 3, 2021

(30) Foreign Application Priority Data
Aug. 7, 2018 (JP) ................... 2018-148401

(51) Int. Cl.
*H02G 1/14* (2006.01)
*H01B 7/282* (2006.01)
(Continued)

(52) U.S. Cl.
CPC ............... *H02G 1/14* (2013.01); *H01B 7/282* (2013.01); *H02G 3/04* (2013.01); *H02G 15/04* (2013.01)

(58) Field of Classification Search
CPC . H02G 1/14; H02G 3/04; H02G 15/04; H01B 7/282
See application file for complete search history.

(56) References Cited

FOREIGN PATENT DOCUMENTS

| JP | H09-161554 A | 6/1997 |
|---|---|---|
| JP | 2011-229200 A | 11/2011 |

(Continued)

OTHER PUBLICATIONS

Translation KR-2017086340-A (Year: 2017).*
(Continued)

*Primary Examiner* — Daniel McNally
(74) *Attorney, Agent, or Firm* — Venjuris, P.C.

(57) ABSTRACT

A hot melt block 20 that is assembled at a portion where an insulating sheath 16 of a cable 10 in which a plurality of electric wires 11 and 12 are collectively surrounded by the insulating sheath 16 is removed and the electric wires 11 and 12 are drawn out, and that is melted through heating. The hot melt block 20 includes: an insertion portion 21 that can be inserted between the electric wires 11 and 12 surrounded by the sheath 16; and a spacer 24 that is fixed to the insertion portion 21, and is disposed between the electric wires 11 and 12 at the portion where the electric wires are drawn out.

10 Claims, 6 Drawing Sheets

(51) Int. Cl.
*H02G 3/04* (2006.01)
*H02G 15/04* (2006.01)

(56) References Cited

FOREIGN PATENT DOCUMENTS

| JP | 2012-033271 A | | 2/2012 | | |
|----|---------------|---|--------|---|---|
| JP | 2012-182924 A | | 9/2012 | | |
| KR | 2017086340 A | * | 7/2017 | ............. | H01B 13/22 |
| WO | WO-2017110377 A1 | * | 6/2017 | ............... | H01B 7/02 |

OTHER PUBLICATIONS

Machine Translation WO-2017110377-A1 (Year: 2017).*
International Search Report issued on Oct. 21, 2019 for WO 2020/031649 A1 (4 pages).

* cited by examiner

HOT MELT BLOCK, CABLE MANUFACTURING METHOD, AND CABLE

CROSS REFERENCE TO RELATED APPLICATIONS

This application is a national phase of PCT application No. PCT/JP2019/028263, filed on 18 Jul. 2019, which claims priority from Japanese patent application No. 2018-148401, filed on 7 Aug. 2018, all of which are incorporated herein by reference.

TECHNICAL FIELD

This specification discloses a technique for keeping water from entering the inside of a cable.

BACKGROUND

Conventionally, the technique for keeping water from entering the inside of a cable has been known. In Patent Document 1, a hot melt block with a cross-shaped cross-section is assembled between electric wires drawn out from a multi-core cable in which a plurality of electric wires are collectively surrounded by a sheath, and the hot melt block is provided with partition walls for partitioning the electric wires. Further, the multi-core cable includes a heat-shrinkable tube that covers outer circumferences of the electric wires to which the hot melt block is assembled and the outer circumference of the sheath. As a result of heat-treating the multi-core cable to melt the hot melt block and fill it between the wires, water is prevented from entering between the wires, and as a result of heat-shrinking the heat-shrinkable tube, water is prevented from entering between the outer circumferences of the electric wires and the outer circumference of the sheath.

PRIOR ART DOCUMENT

Patent Document

Patent Document 1: JP 2012-182924A

SUMMARY OF THE INVENTION

Problems to be Solved

In the configuration disclosed in Patent Document 1, the position of the hot melt block assembled between the electric wires is held as a result of the partition walls being disposed between the electric wires, however, there is concern that, if the hot melt block is displaced during heat treatment, a gap in which a melted hot melt is not filled will be created between the electric wires and that waterproof performance of the cable will be reduced.

The technique described in this specification has been completed based on the above circumstances, and an object thereof is to suppress a reduction in waterproof performance due to displacement of the hot melt block.

Means to Solve the Problem

A hot melt block described in this specification is a hot melt block that is assembled at a portion where an insulating sheath of a cable in which a plurality of electric wires are collectively surrounded by the insulating sheath is removed and the electric wires are drawn out, and that is melted through heating. The hot melt block includes: an insertion portion that can be inserted between the electric wires surrounded by the sheath; and a spacer that is fixed to the insertion portion, and is disposed between the electric wires at the portion where the electric wires are drawn out.

A cable manufacturing method described in this specification is a cable manufacturing method in which a hot melt block is assembled at a portion where an insulating sheath of a cable in which a plurality of electric wires are collectively surrounded by the insulating sheath is removed and the electric wires are drawn out, and, in a state where a heat-shrinkable tube surrounds the electric wires to which the hot melt block is assembled, the hot melt block and the heat-shrinkable tube are heated to melt the hot melt block and shrink the heat-shrinkable tube to be brought into close contact with the electric wires. The hot melt block includes: an insertion portion that can be inserted between the electric wires surrounded by the sheath; and a spacer to which the insertion portion is fixed, and that is disposed between the electric wires in a state where the sheath is removed and the electric wires are drawn out. The cable manufacturing method includes: an assembling step of assembling the hot melt block to the cable so that the insertion portion is inserted between the cables surrounded by the sheath and the spacer is disposed between the electric wires in the state where the sheath is removed and the electric wires are drawn out; and a heating step of heating the hot melt block and the heat shrink tube in a state where the cable to which the hot melt block is assembled in the assembly step is inserted into the heat-shrinkable tube.

A cable described in this specification is a cable including: a plurality of electric wires; an insulating sheath that collectively surrounds the electric wires; a heat-shrinkable tube that covers an end portion of the sheath and the electric wires in a state where the sheath is removed and the electric wires are drawn out, in a close contact state; and a hot melt that is disposed between the electric wires to prevent water from the entering. The hot melt is in close contact with the electric wires surrounded by the sheath, and is filled between the electric wires in the state where the sheath is removed and the electric wires are drawn out.

According to the above configuration, by inserting the insertion portion of the hot melt block between the electric wires surrounded by the sheath, it is possible to suppress displacement of the hot melt block during heating. Thus, it is possible to suppress a reduction in waterproof performance due to displacement of the hot melt block. In addition, if the insertion portion is melted through heating, it is possible to fill the gap between the electric wires surrounded by the sheath, thereby keeping water from entering between the electric wires.

The following aspects are preferable embodiments of the technique described in this specification.

The insertion portion is formed in a tapered shape.

In this way, the insertion portion can be easily inserted when assembling the hot melt block.

The insertion portion is provided with an insertion wall that partitions the electric wires adjacent to each other.

In this way, positioning accuracy of the insertion portion can be improved by the insertion wall that separates the adjacent electric wires.

The spacer includes a main body disposed between the electric wires, and an overhang that projects radially from a rear end portion of the main body and partitions the electric wires.

In this way, the distance between the adjacent electric wires can be maintained by the overhang.

The electric wires include a signal line and a power line with an outer diameter larger than that of the signal line.

In this way, because the outer diameters of the electric wires are different, displacement of the hot melt block can be suppressed by the insertion portion inserted between the electric wires in a configuration in which the hot melt block is likely to be displaced between the electric wires.

Effect of the Invention

According to the technique described in this specification, it is possible to suppress a reduction in waterproof performance due to displacement of the hot melt block.

DETAILED DESCRIPTION TO EXECUTE THE INVENTION

Embodiment 1

Figure 1:
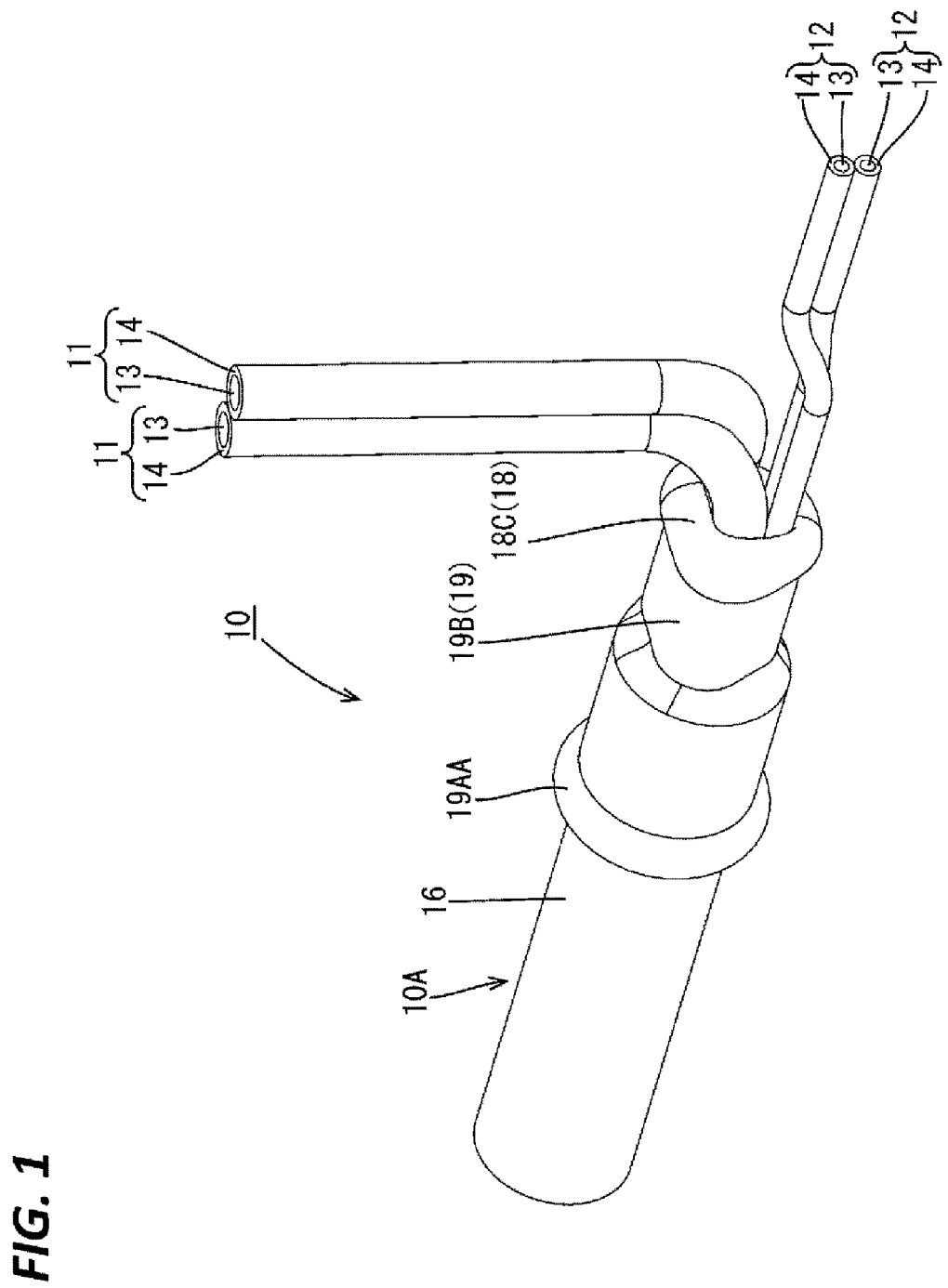
FIG. 1 is a perspective view illustrating a waterproof portion of a cable of Embodiment 1.

A cable 10 (FIG. 1) of the present embodiment can be, for example, routed between a power source such as a battery and a load such as an in-vehicle electrical component or a motor, in a vehicle such as an automobile. The cable 10 can be disposed extending in any direction, but in the following, the left side of FIG. 2 will be described as the front side and the right side will be described as the rear side.

Figure 2:
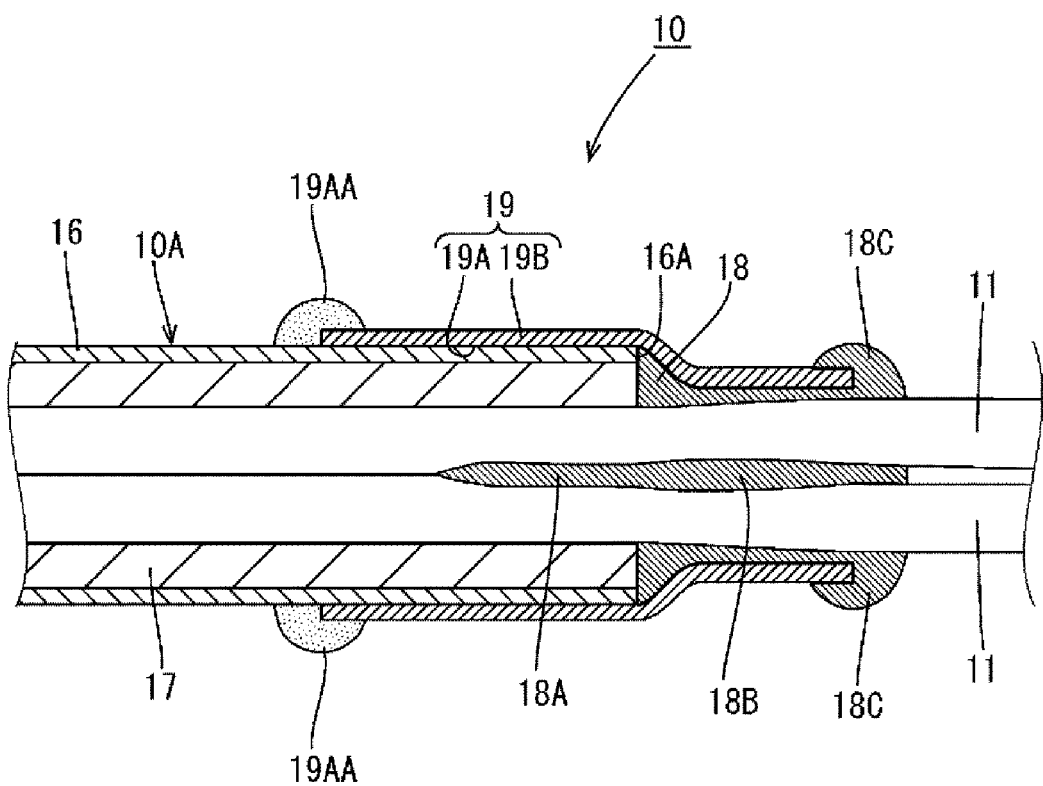
FIG. 2 is a cross-sectional view illustrating the waterproof portion of the cable.
Figure 3:
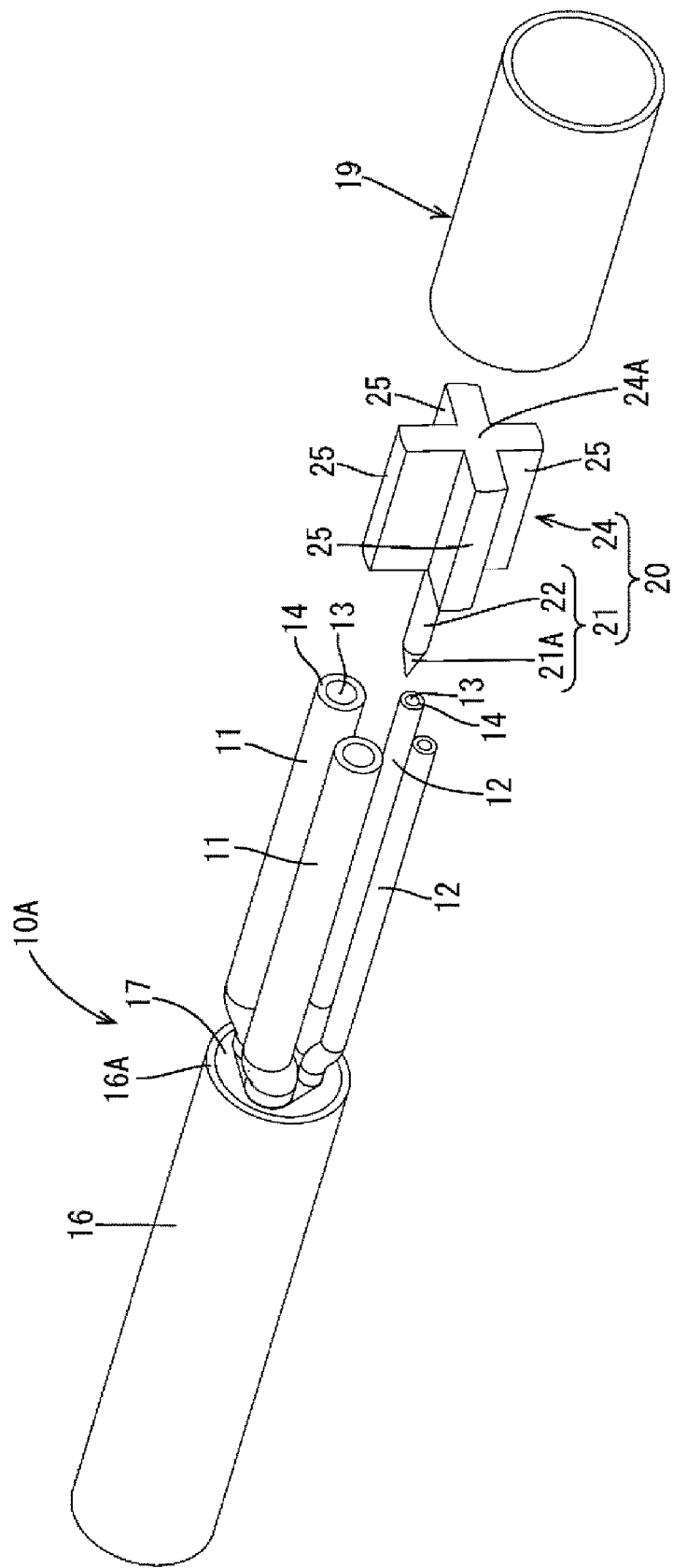
FIG. 3 is an exploded perspective view of the cable.

As illustrated in FIGS. 2 and 3, the cable 10 includes a cable body 10A in which a sheath 16 is removed and a plurality of electric wires 11 and 12 are drawn out to the rear side, a hot melt 18 that prevents water from entering at a portion where the electric wires 11 and 12 are drawn out, and a heat-shrinkable tube 19 that covers a region between an end portion of the sheath 16 and the electric wires 11 and 12 drawn out to the rear side, in a close contact state.

The cable body 10A includes the electric wires 11 and 12, the sheath 16 that collectively surrounds the electric wires 11 and 12, and a filling member 17 disposed in a gap between the electric wires 11 and 12 and the sheath 16. In the present embodiment, the electric wires 11 and 12 are four electric wires each with a circular outer circumference, and include two power lines 11 through which a driving current of the motor or the like flows and two signal lines 12 through which a smaller current than that of the power line 11 flows, the outer diameter of the signal line 12 being smaller than that of the power line 11. Each of the electric wires 11 and 12 includes a core wire 13 and an insulating coating 14 made of an insulating synthetic resin that covers the outer circumference of the core wire 13. The core wire 13 is made of, for example, a metal such as aluminum, an aluminum alloy, copper, or a copper alloy, and a stranded wire made by twisting together fine metal wires, a single core wire made of a single metal, or the like can be used. Note that, at an end portion of each of the electric wires 11 and 12, a terminal (not shown) to be connected to a mating terminal (not shown) is attached through crimping or the like to the core wire 13 exposed by removing the insulating coating 14.

The sheath 16 is made of an insulating synthetic resin, has a cylindrical shape that collectively surrounds the electric wires 11 and 12, and has an end 16A formed by removing a rear end portion of the sheath 16, and the electric wires 11 and 12 inside the sheath 16 are drawn out to the rear side of the end 16A. The filling member 17 is formed by packing, for example, an insulating thread or paper tape between the electric wires 11 and 12 and the sheath 16, and fills the gap between the electric wires 11 and 12 and the sheath 16 to hold the positions of the electric wires 11 and 12, and suppresses deformation such as bending of the electric wires 11 and 12. The electric wires 11 and 12 surrounded by the sheath 16 extend rearward from a rear end surface of the filling member 17.

As illustrated in FIG. 2, the hot melt 18 has an embedded portion 18A embedded between the electric wires 11 and 12 in the sheath 16, and a filling portion 18B filled inside the heat-shrinkable tube 19 in a region in which the electric wires 11 and 12 are drawn out. Note that the hot melt 18 on the rear side of the filling portion 18B is a bulging portion 18C protruding from the sheath 16. The hot melt 18 is made of a solid thermoplastic adhesive (for example, PA (polyamide), EVA (ethylene vinyl alcohol), polyester-based adhesive, olefin or the like) at a predetermined temperature (for example, 25° C.), and a solid hot melt block 20 is softened or melted through heating to develop adhesiveness, and then solidified to form the hot melt 18.

As illustrated in FIG. 3, the hot melt block 20 includes an insertion portion 21 that can be inserted from the rear side (outside) between the electric wires 11 and 12 surrounded by the end 16A of the sheath 16, and a cross-shaped spacer 24 that is integrally formed with the insertion portion 21 and is disposed between the electric wires 11 and 12 rearward of the end 16A of the sheath 16.

The insertion portion 21 has a conical tapered portion 21A having an outer diameter that decreases in size toward its leading end, and a columnar pillar portion 22 connected to the rear side of the tapered portion 21A. When the insertion portion 21 is inserted between the electric wires 11 and 12 surrounded by the sheath 16 and then solidified, it becomes the embedded portion 18A that is in close contact with the electric wires 11 and 12 in the sheath 16 (see FIG. 2). As illustrated in FIG. 3, the spacer 24 includes a core portion 24A connected to the rear side of the insertion portion 21 and partition walls 25 that extend from the core portion 24A in a cross shape in four directions and partition the electric wires 11 and 12. Each partition wall 25 has a rectangular plate shape, and the electric wires 11 and 12 are arranged in an aligned state in a space between adjacent partition walls 25.

The hot melt block 20 can be integrally formed through molding in which a molten resin is injected into a mold. The molding of the hot melt block 20 is not limited to this, and the insertion portion 21 and the spacer 24 may be formed separately, and the insertion portion 21 may be fixed to a front end portion of the spacer 24 by adhesion or the like.

The heat-shrinkable tube 19 is a tubular member that shrinks when heated, and has a size that surrounds the end portion of the sheath 16 and the electric wires 11 and 12 drawn out from the end portion of the sheath 16 before heating. Once heated, the heat-shrinkable tube 19 shrinks and its front end side (one end side) comes into close contact with the outer peripheral surface of the sheath 16 and its rear end side (other end side) comes into close contact with the outer peripheral surfaces of the electric wires 11 and 12 drawn out to the outside. The heat-shrinkable tube 19 can be formed of, for example, a two-layer synthetic resin material, in which an outer layer 19B can be, for example, a polyolefin resin and a variant thereof, and an inner layer 19A can be an adhesive made of, for example, EVA (ethylene vinyl alcohol), PA (polyamide), a polyester-based adhesive, or the like. The adhesive can be a thermoplastic adhesive that develops adhesiveness due to softening or melting as a result of being heated. Note that as illustrated in FIG. 2, a front side of the inner layer 19A is a protruding portion 19AA protruding on the forward side of the outer layer 19B.

Next, a manufacturing process of the cable 10 according to the present embodiment will be described.

The end portion of the sheath 16 of the cable 10 in which the electric wires 11 and 12 are collectively surrounded by the sheath 16 is stripped off so that the electric wires 11 and 12 are drawn out to the outside in an exposed state (FIG. 3).

(Assembly Step)

Figure 4:
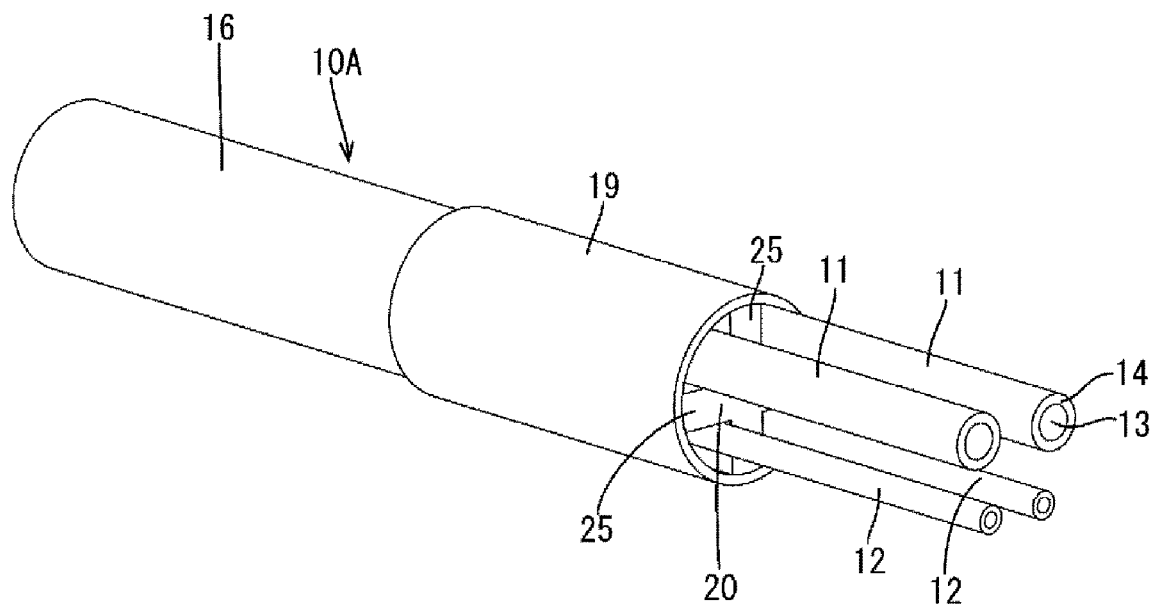
FIG. 4 is a perspective view illustrating a state in which a hot melt block is assembled to a cable and inserted into a heat-shrinkable tube.
Figure 5:
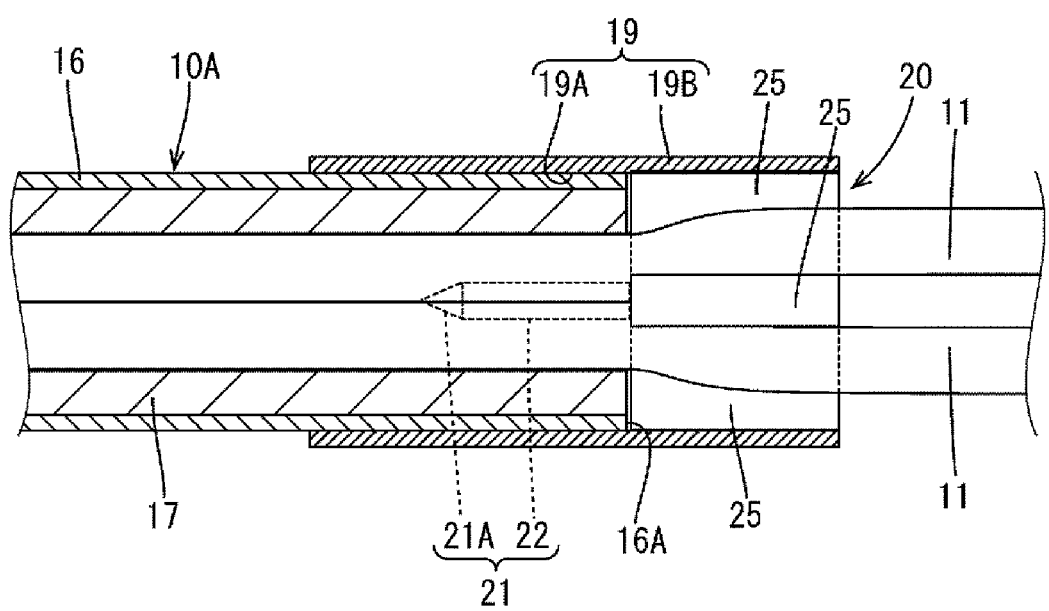
FIG. 5 is a cross-sectional view of the state of FIG. 4.

Next, as illustrated in FIGS. 4 and 5, the hot melt block 20 is assembled between the electric wires 11 and 12 in a state of being drawn out to the rear side of the sheath 16, and the sheath 16 and the electric wires 11 and 12 that are drawn out are passed through the tubular heat-shrinkable tube 19 before being shrunk, to a predetermined position. In the assembly of the hot melt block 20, the insertion portion 21 of the hot melt block 20 is inserted between the electric wires 11 and 12 surrounded by the end 16A of the sheath 16, and each of the electric wires 11 and 12 is inserted into a space between the adjacent partition walls 25 of the hot melt block 20.

(Heating Step)

Then, the cable 10 is inserted into a heating apparatus (not shown) to undergo heat treatment. As a result of performing heat treatment, the melted hot melt block 20 permeates to be filled between the electric wires 11 and 12 and then solidifies, thus preventing water from entering between the electric wires 11 and 12, and the heat-shrinkable tube 19 is heat-shrunk, thus preventing water from entering from the outer peripheral side of the sheath 16 and the outer peripheral side of the electric wires 11 and 12.

According to the above embodiment, the following operations and effects are obtained.

Provided is the hot melt block 20 that is assembled at a portion where an insulating sheath 16 of the cable 10 in which the electric wires 11 and 12 are collectively surrounded by the insulating sheath 16 is removed and the electric wires 11 and 12 are drawn out, and that is melted through heating. The hot melt block 20 includes: an insertion portion 21 that can be inserted between the electric wires 11 and 12 surrounded by the sheath 16; and a spacer 24 that is fixed to the insertion portion 21, and is disposed between the electric wires 11 and 12 at the portion where the sheath is removed and the electric wires are drawn out.

According to the present embodiment, because the position of the hot melt block 20 is held by inserting the insertion portion 21 of the hot melt block 20 between the electric wires 11 and 12 surrounded by the sheath 16, displacement of the hot melt block during heating can be suppressed. Thus, a gap is less likely to occur between the electric wires 11 and 12 due to displacement of the hot melt block 20 and a reduction in waterproof performance can be suppressed. Further, when the insertion portion 21 is melted through heating, the gap between the electric wires 11 and 12 surrounded by the sheath 16 can be filled, thereby keeping water from entering between the electric wires 11 and 12.

Further, the insertion portion 21 is formed in a tapered shape.

In this way, the insertion portion 21 can be easily inserted when assembling the hot melt block 20.

The electric wires 11 and 12 include the signal line 12 and the power line 11 that has an outer diameter larger than that of the signal line 12.

In this way, since the outer diameters of the electric wires 11 and 12 are different, in a configuration in which the hot melt block 20 is likely to be displaced between the electric wires 11 and 12, displacement of the hot melt block 20 can be suppressed by the insertion portion 21 inserted between the electric wires 11 and 12.

Embodiment 2

Figure 6:
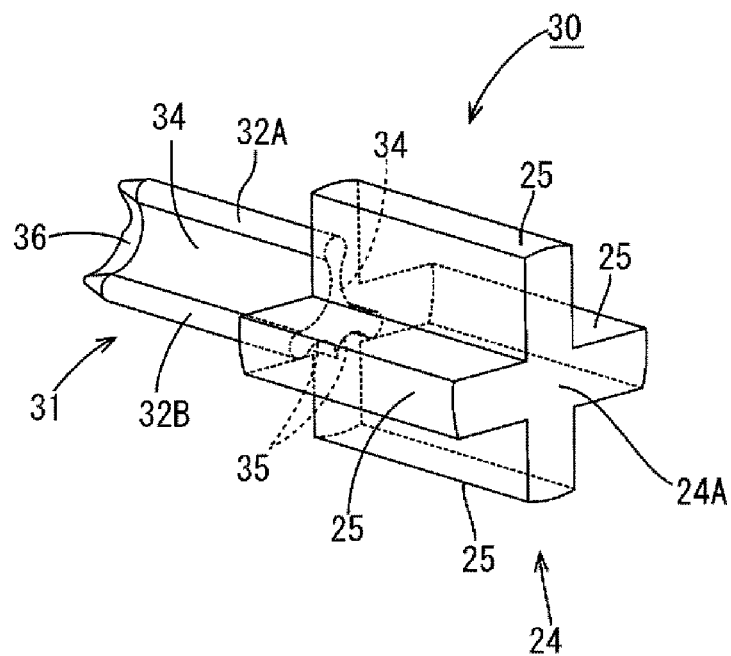
FIG. 6 is a perspective view illustrating a hot melt block of Embodiment 2.

Next, Embodiment 2 will be described with reference to FIG. 6. Embodiment 2 is different from Embodiment 1 in the shape of an insertion portion 31 of a hot melt block 30. Since the other components are the same as those in Embodiment 1, the same components as those in Embodiment 1 are denoted by the same reference numerals and a description thereof will be omitted.

The hot melt block 30 includes an insertion portion 31 that can be inserted between the electric wires 11 and 12 surrounded by the end 16A of the sheath 16, and a spacer 24. The insertion portion 31 includes a first insertion wall 32A that partitions the electric wires 11 and 12 surrounded by the sheath 16, and a second insertion wall 32B that extends in a direction intersecting the first insertion wall 32A.

The leading end of the first insertion wall 32A and the leading end of the second insertion wall 32B are connected via a recessed surface 34 extending along the outer peripheral surface of each of the electric wires 11. A pair of recessed surfaces 35 extending along the outer peripheral surfaces of a pair of electric wires 12 are formed on a lower surface of the second insertion wall 32B. The leading end of each of the first insertion wall 32A, the second insertion wall 32B, and the recessed surfaces 34 and 35 is a tapered portion 36 having a thickness dimension decreasing in an inclined manner toward the forward side.

According to the second embodiment, accuracy of positioning of the insertion portion 31 can be improved by the insertion walls 32A and 32B that partition the adjacent electric wires 11 and 12.

Embodiment 3

Figure 7:
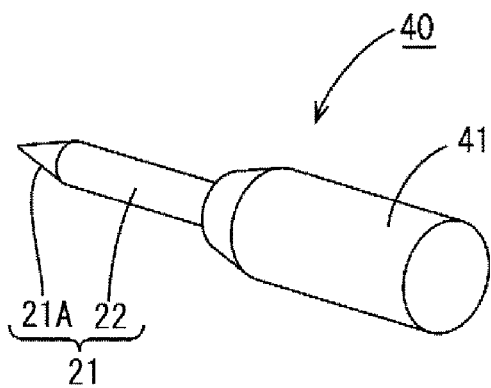
FIG. 7 is a perspective view illustrating a hot melt block of Embodiment 3.

Next, Embodiment 3 will be described with reference to FIG. 7. Embodiment 3 is different from Embodiment 1 in the shape of a spacer 41 of a hot melt block 40. Since the other components are the same as those in Embodiment 1, the same components as those in Embodiment 1 are denoted by the same reference numerals and a description thereof will be omitted.

The hot melt block 40 includes the insertion portion 21 and the spacer 41 fixed to the insertion portion 21 and disposed between the electric wires 11 and 12 drawn out rearward at the end 16A of the sheath 16. The spacer 41 has a columnar shape, and its front end portion has an outer peripheral surface cut out in a tapered shape. The axial center of the spacer 41 is disposed at a central portion between the electric wires 11 and 12 drawn out rearward at the end 16A.

Embodiment 4

Figure 8:
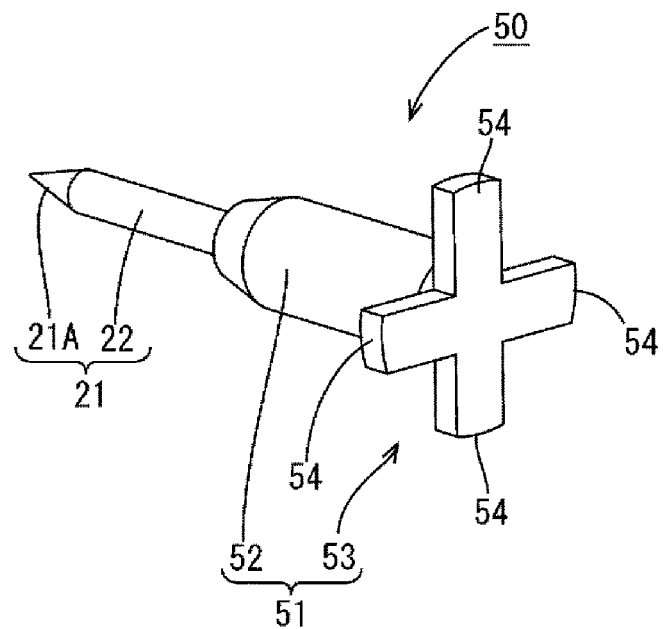
FIG. 8 is a perspective view illustrating a hot melt block of Embodiment 4.

Next, Embodiment 4 will be described with reference to FIG. 8. Embodiment 4 is different from Embodiment 3 in that an overhang 53 is provided at a rear end portion of a hot melt block 50. Since the other components are the same as those in Embodiment 3, the same components as those in Embodiment 3 are denoted by the same reference numerals and a description thereof will be omitted.

A spacer 51 of the hot melt block 50 includes a columnar main body 52 disposed between the electric wires 11 and 12, and the overhang 53 that projects radially with respect to an axial direction of the hot melt block 50 and partitions the electric wires 11 and 12. The overhang 53 has a plate shape in which a partition portion 54 for partitioning the electric wires 11 and 12 extends in a cross shape in the radial direction, and is integrally formed with a rear end portion of the main body 52.

According to Embodiment 4, the distance between the adjacent electric wires 11 and 12 can be maintained by the overhang 53. Further, when assembling the hot melt block 50, the overhang 53 can be used for positioning the hot melt block 50 in a front-rear direction (direction of insertion direction into the heat-shrinkable tube 19).

Embodiment 5

Figure 9:
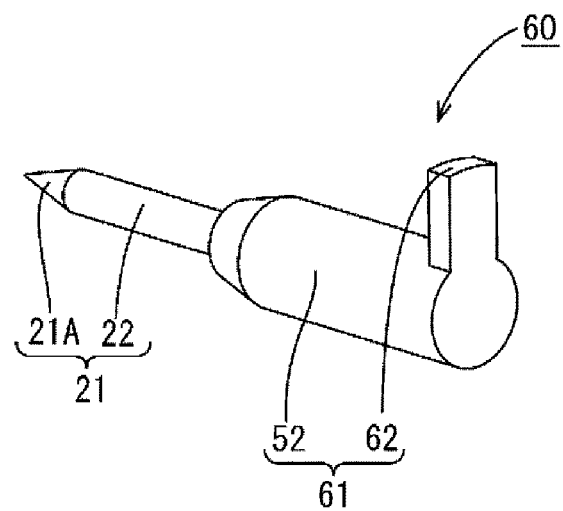
FIG. 9 is a perspective view illustrating a hot melt block of Embodiment 5.

Next, Embodiment 5 will be described with reference to FIG. 9. Embodiment 5 is different from Embodiment 4 in the shape of an overhang 62 of a hot melt block 60. Since the other components are the same as those in Embodiment 4, the same components as those in Embodiment 4 are denoted by the same reference numerals and a description thereof will be omitted.

A spacer 61 of the hot melt block 60 includes the main body 52 and the overhang 62 that projects radially with respect to the axial direction of the hot melt block 60 and partitions a pair of electric wires 11. The overhang 62 has a rectangular plate shape and stands upward (radially) from the rear end portion of the main body 52.

Other Embodiments

The technique described in the present specification is not limited to the embodiments described in the above description and drawings, and for example, the following embodiments are also included in the technical scope of the technique described in the present specification.

(1) The number of electric wires 11 and 12 is not limited to four, and can be changed as appropriate. Further, the cable is not limited to a cable including both the power line 11 and the signal line 12, and may be a cable including only one of the power line 11 and the signal line 12.

(2) Combinations of the insertion portions 21 and 31 and the spacers 24, 41, 51 and 61 are not limited to the combinations of the above-described embodiments, and can be appropriately changed. Further, the shapes of the insertion portions and the spacers can also be changed as appropriate. For example, the tapered portions 21A and 36 may not be formed in the insertion portions 21 and 31.

LIST OF REFERENCE NUMERALS

10 Cable
11 Power line (Electric wire)
12 Signal line (Electric wire)
13 Core wire
14 Insulating coating
16 Sheath
17 Filling member
18 Hot melt
19 Heat-shrinkable tube
20, 30, 40, 50 Hot melt block
21, 31 Insertion portion
21A, 36 Tapered portion
22 Pillar portion
24, 41, 51, 61 Spacer
24A Core portion
25 Partition wall
30 Hot melt block
32A First insertion wall (Insertion wall)
32B Second insertion wall (Insertion wall)
53, 62 Overhang
62 Overhang

What is claimed is:

1. A hot melt block comprising:
an insertion portion capable of being inserted between a plurality of electric wires surrounded by an insulating sheath of a cable; and
a spacer that is fixed to the insertion portion, and is disposed between the electric wires at a portion of the cable where the insulating sheath is removed and the electric wires are drawn out,
wherein the insertion portion is provided with a plurality of insertion walls that partition the electric wires adjacent to each other.

2. The hot melt block according to claim 1, wherein the insertion portion is formed in a tapered shape.

3. The hot melt block according to claim 1, wherein the spacer includes a main body disposed between the electric wires, and an overhang that projects radially from a rear end portion of the main body and partitions the electric wires.

4. The hot melt block according to claim 1, wherein the spacer is integrally formed with the insertion portion.

5. The hot melt block according to claim 1, wherein the spacer includes a core portion connected to a rear side of the insertion portion and partition walls that extend in a radial direction from the core portion and partition the electric wires.

6. The hot melt block according to claim 1, wherein the plurality of insertion walls includes a first insertion wall, and a second insertion wall that extends in a direction intersecting the first insertion wall.

7. A cable manufacturing method using a hot melt block including:
an insertion portion capable of being inserted between a plurality of electric wires surrounded by an insulating sheath of a cable; and
a spacer to which the insertion portion is fixed, and that is disposed between the electric wires in a state where the insulating sheath is removed and the electric wires are drawn out,
wherein the cable manufacturing method comprises:
assembling the hot melt block to the cable so that the insertion portion is inserted between the electric wires surrounded by the insulating sheath and the spacer is disposed between the electric wires in the state where the insulating sheath is removed and the electric wires are drawn out, and
heating the hot melt block and a heat-shrinkable tube that surrounds the electric wires in a state where the cable to which the hot melt block is assembled in the assembling is inserted into the heat-shrinkable tube, thereby melting the hot melt block and shrinking the heat-shrinkable tube to be brought into close contact with the electric wires, and the insertion portion is provided with a plurality of insertion walls that partition the electric wires adjacent to each other.

8. The cable manufacturing method according to claim 7, wherein the electric wires include a signal line and a power line with an outer diameter larger than that of the signal line.

9. A cable comprising:
a plurality of electric wires;
an insulating sheath that collectively surrounds the electric wires;
a heat-shrinkable tube that covers an end portion of the sheath and the electric wires in a state where the sheath is removed and the electric wires are drawn out, in a close contact state; and
a hot melt that is disposed between the electric wires to prevent water from entering, wherein the hot melt is in close contact with the electric wires surrounded by the sheath, and is filled between the electric wires in the state where the sheath is removed and the electric wires are drawn out, and the hot melt includes an embedded portion embedded between the electric wires surrounded by the sheath, a filling portion filled inside the heat-shrinkable tube in a region in which the sheath is removed and the electric wires are drawn out, and a bulging portion protruding from the sheath on a rear side of the filling portion.

10. The cable according to claim 9, wherein the electric wires include a signal line and a power line with an outer diameter larger than that of the signal line.

* * * * *